United States Patent Office 3,733,381
Patented May 15, 1973

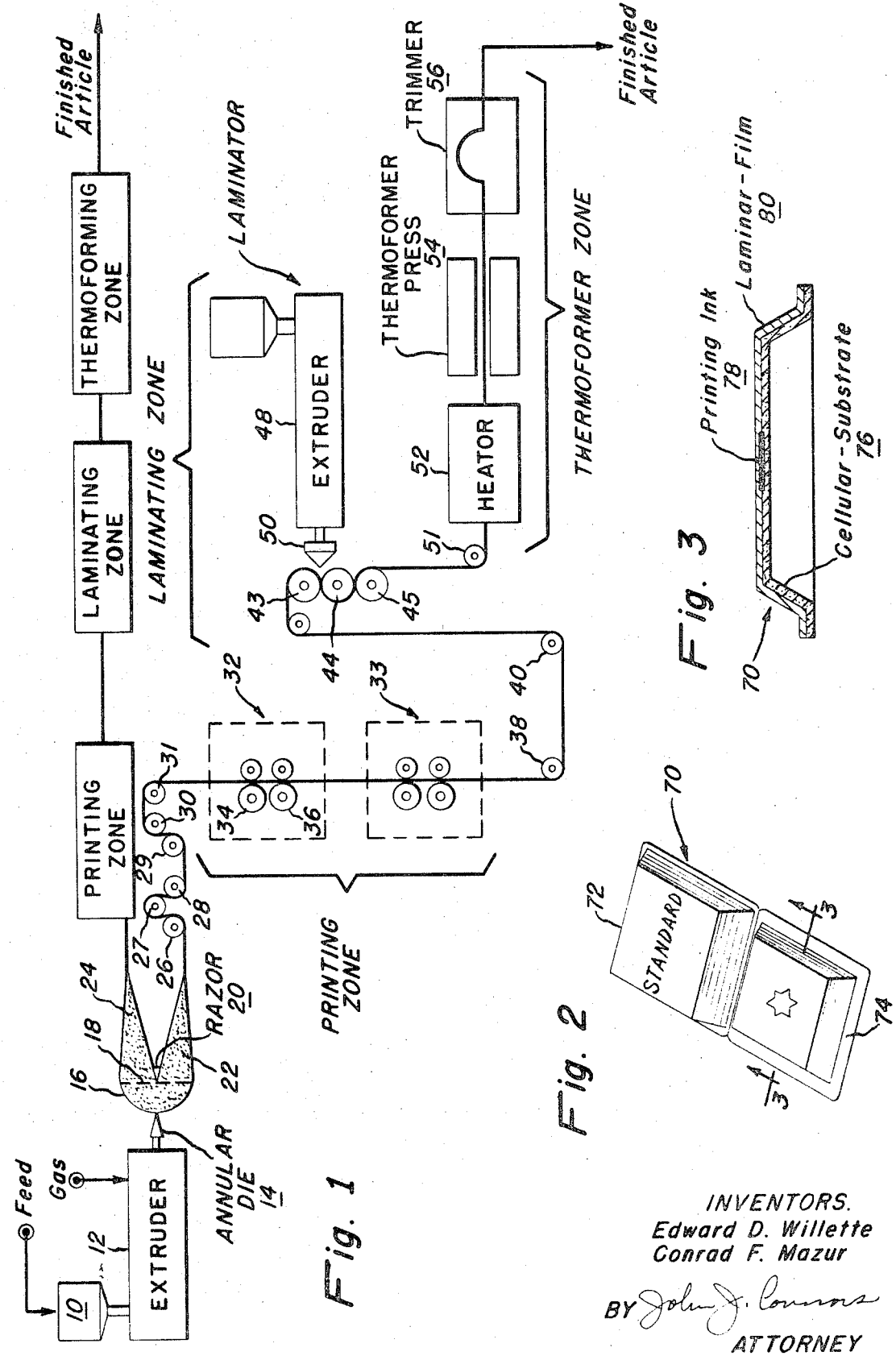

3,733,381
CONTINUOUS PROCESS FOR MAKING THERMO-
FORMED ARTICLES OF MANUFACTURE
Edward D. Willette, Winnetka, Ill., and Conrad F. Mazur, Chippewa Falls, Wis., assignors to Standard Oil Company, Chicago, Ill.
Filed Dec. 31, 1970, Ser. No. 103,019
Int. Cl. B29d 27/00
U.S. Cl. 264—47
1 Claim

ABSTRACT OF THE DISCLOSURE

Polymeric material, with gas injection, is continuously extruded to form a continuous web of foam. The web is then directly laminated and the article of manufacture is directly thermoformed from the laminated web. Optionally, the web surface can be printed upon before lamination. This provides an article having a cellular-structure polymeric substrate having an imprinted surface protected by a laminar-like coating.

BACKGROUND

Conventionally, a laminated foam, thermoformed article is made by a three, separate-stepped process. First, polymeric material is extruded while simultaneously injecting gas into the material to form a foam or cellular-structure web. Second, this web is wound about a roll, aged for several hours (usually up to about 8 hours), and then laminated. The roll is then permitted to age for a day or two before conducting the third step of thermoforming the article. Aging has been considered necessary in order to avoid cell collapse and distortion of the web during laminating and thermoforming operations.

THE INVENTION

We have invented a continuous process for extruding, laminating and thermoforming laminated foam articles. In our process the step of rolling up the web from the extruder is avoided. We feed the extruded foam or cellular-structure web directly to a laminating zone, and then from the laminating zone directly to a thermoforming zone. Economies in manpower, space and time are thus realized. In accordance with another feature of our invention, the web may be printed prior to laminating. This provides an article which has a cellular-structure, polymeric substrate having an imprinted surface, the imprinting on the surface being protected by the laminar-like film coating the surface.

Specifically, polymeric material is extruded into web form while injecting into the polymeric material gas which expands to form a cellular structure in the web. The gas has a vapor pressure higher than the pressure surrounding the web under existing temperature and pressure conditions. At least some of this gas is occluded in the cell structure of the web. Immediately (by immediately we mean within a few minutes) after extruding the web, at least one surface of the web is coated with a thin film of hot polymeric material. The coated web is then passed through compression means which press the hot film of polymeric material against the web. The occluded gas expands within the cell structure and prevents substantial cell collapse as pressure is applied to the web.

Suitable polymeric materials which may be used in our process are acrylonitrile-butadiene-styrene polymers, polyvinylchloride, crystalline polystyrene, rubber modified polystyrene, acrylonitrile polystyrene, polypropylene, polyethylene, polyesters, for example, polymers of ethylene and terephthalic acid, and the like.

Suitable gas blowing agents which may be used in our process are Freon, butane, normal pentane and iso-pentane.

The volume of gas added to the polymeric material depends on the type of gas used, the type of foam desired and the solubility of the polymeric material in the gas. We have found iso-pentane and Freon to be useful in making a continuous foam web of crystalline polystyrene. With iso-pentane, from about 3.5 to about 5.0 wt. percent gas is used. With Freon, about 6.0 to about 10.0 wt. percent gas is used. The iso-pentane is preferred because of its cost; however, crystalline polystyrene is not very soluble in Freon, and if it is used there is less chance of cell collapse. Nevertheless, careful control of conditions while using iso-pentane does not pose any serious problem in making the continuous foam web.

DESCRIPTION OF THE DRAWINGS

FIG. 1 is a schematic flow diagram illustrating the process of our invention.

FIG. 2 is a perspective view of an article of manufacture made by our process, showing the printed exterior of the article.

FIG. 3 is a cross-sectional view taken along the line 3—3 of FIG. 2.

PREFERRED EMBODIMENT

The following is illustrative of our process using crystalline polystyrene as the polymeric material and iso-pentane as the gas. As shown in FIG. 1, pellets of a thermoplastic polymeric material stored in hopper 10 are fed into extruder 12 and melted. Gas under pressure generally ranging between about 2000 and about 4000 p.s.i. is injected into extruder 12. The temperature of the blend of gas and polymeric material within extruder 12 generally ranges between about 230° and about 275° F. However, as previously mentioned, extruding conditions may vary depending upon the polymeric material and gas used.

The screw (not shown) of extruder 12 feeds the hot blend of gas and polymeric material through annular die 14. As the blend is exposed to the atmosphere, the entrained gas expands rapidly, bubbling outwardly and escaping to the atmosphere. This forms a cellular-structure tubular member 16 which is drawn over hemispherical mandrel 18. Not all gas escapes, however. Some is occluded within the cell structure. As tubular member 16 moves over mandrel 18, razors 20, mounted on the mandrel, slit member 16 into two equal web-sections 22 and 24.

According to our invention, web-sections 22 and 24 are then each moved directly and preferably immediately through a printing zone, laminating zone and thermoforming zone. Although we have shown web-sections 22 and 24 being printed before moving into the lamination zone, this is an optional feature. Our process thus avoids what we have found to be the unnecessary web aging step before and after lamination.

The uninterrupted web-section 22 is shown in some detail. Web-section 22 winds about tension rollers 26, 27 and 28, around and over drive rollers 29, 30 and 31, into printing press 32 and then into dryer 33. Tension rollers 26–28 flatten web-section 22 so that it can be printed, laminated and then used to make thermoformed articles. Since web-section 22 is never rolled up, it is free of web distortions associated with wound rolls. The web is therefore easy to keep wrinkle-free.

The preferred type of printing pres is an offset gravure press. This type of press has all the advantages of gravure printing and includes offset cylinders 34 and 36 having a soft cover. The offset gravure press avoids unnecesary deformation of web-section 22 and eliminates indexing problems when the printed web-section is moved into the thermoforming zone. It is important that the ink used in printing bonds well to the surface of web-section 22, anchoring itself to the polymeric material. Moreover, the solvent in the ink should also have a high enough vapor pressure so that, evaporating rapidly, all of it is removed by dryer 33 before printed web-section 22 moves to the laminating zone. This avoids blistering of the laminar-like coating subsequently applied to web-section 22. A preferred ink is sold by Interchem Printing Inks, Division of Interchem Chemical Corp., under the name Pliolox.

As web-section 22 leaves dryer 33 it winds about tension rollers 38 and 40 and then moves to a calendering stand including rollers 43, and 44 and 45. The gap between rollers 43 and 44 and between rollers 44 and 45 normally ranges between about 0.015 and about 0.080 inch for web thicknesses ranging between about 0.060 and about 0.200 inch. As described in detail in U.S. Ser. No. 791,393, filed Jan. 15, 1969 assigned to the same assignee as this application now Pat. No. 3,669,794 and entitled Extrusion Coating of Heat Fusable Foam Sheet, rollers 43–45 may be moved at different speeds to avoid wrinkles in web-section 22.

The surface of web-section 22 is coated with a polymeric laminate material as section 22 winds around rollers 43–45. The polymeric laminate material can be of the same composition as web-section 22 or it may be different. This polymeric material is melted in extruder 48 and flows through flat film die 50 directly onto one surface of web-section 22 as the section moves across roller 44. The thickness of the laminar-like coating applied to the web normally ranges between about 0.003 and about 0.009 inch. Roller 43 is normally at a temperature ranging between about 70° and about 140° F. Rollers 44 and 45 are heated and maintained at a temperature ranging between about 70° and about 150° F., preferably between about 120° and about 150° F. We have found that the gas initially injected into the cellular polymeric material of web-section 22 should have a vapor pressure higher than the pressure surrounding the web-section, and that roller 45 should be heated to the aforesaid temperature. When both of these conditions are observed, the cell structure of web-section 22 is maintained. The occluded gas tends to expand within web-section 22 as this section winds about rollers 43–45, pushing from within the cell structure out against the force of the rollers. This maintains the cell structure of web-section 22 during the laminating and subsequent calendering operation. Laminating conditions may vary with different materials.

Another laminating extruder (not shown) may be used to apply film to the side of web-section 22 opposite extruder 48. This second extruder may be located directly opposite extruder 48 or downstream from extruder 48. Thus both sides of web-section 22 may be laminated either simultaneously or sequentially. This is optional.

When coated web-section 22 leaves the lamination zone, it winds around chill roll 51, cools and moves into a conventional thermoforming zone. Its movement is intermittent, stopping momentarily and then once again moving forward in an indexing manner. As coated web-section 22 moves through heater 52, its temperature is raised to about 300–900° F. This expels residual gas within web-section 22, fully expanding the web's cell structure and rendering web-section 22 pliable as it moves into thermoforming press 54. While in press 54 it stops momentarily and is forced into a mold which conforms to the shape of the article being made. Web-section 22, impressed with the design of the article, then moves to trimmer 56 which punches out the article.

FIGS. 2 and 3 show the finished article 70 in the form of tray 72 having hinged cover 74 attached to the tray. This article 70 is shown merely as an example. Containers such as bowls, cups, glasses, plates, etc., could also be made according to our process. All would have the common features depicted in FIG. 3, namely, a cellular-structure, polymeric substrate 76, printing ink 78 deposited directly on the surface of the substrate, and a film of protective polymeric material 80 coating the printed surface.

A finished article, printed and laminated according to our process, has superior physical properties. The laminar-like coating imparts gloss, rigidity, abrasion resistance and cut resistance to the article, and the cellular structure of the substrate imparts rigidity, toughness and insulated properties to the article. The laminar-like coating also protects the printing on the cellular substrate.

We claim:
1. A process comprising the sequential steps of
continuously extruding thermoplastic polymeric material into web form having a thickness in the range of from about 0.060 to about 0.200 inch and during extrusion injecting into said polymeric material gas which expands to form a cellular structure in the web,
printing on at least one surface of the web,
immediately after printing on the web, coating the printed surface of the web with a thin film of hot polymeric material, said film having a thickness in the range of from about 0.003 to about 0.009 inch,
continuously passing the coated web through compression means which press the hot film of polymeric material against the web, with said compression means including at least one pair of rollers having a gap therebetween ranging between about 0.015 and about 0.200 inch, and being at a temperature in the range of from about 70° to about 150° so that said occluded gas expands within the cellular structure to prevent substantial cell collapse as pressure is applied to the web, and
continuously passing the web through a thermoforming zone to make a thermoformed article subsequent to applying said film.

References Cited

UNITED STATES PATENTS

| | | | |
|---|---|---|---|
| 2,917,217 | 12/1959 | Sisson | 264—DIG. 14 |
| 3,159,698 | 12/1964 | Suh et al. | 156—79 UX |
| 3,220,902 | 11/1965 | Edwards | 264—45 X |
| 3,551,243 | 12/1970 | Schuur et al. | 156—244 |
| 3,148,103 | 9/1964 | Gallagher | 264—132 X |
| 3,368,014 | 2/1968 | Tijunelis | 264—132 |
| 3,485,907 | 12/1969 | Quackenbush et al. | 264—132 X |
| 3,238,565 | 3/1966 | Jacobs | 264—321 X |
| 3,669,794 | 6/1972 | Mazur | 156—244 |

OTHER REFERENCES

Collins, F. H.: "Controlled Density Polystyrene Foam Extrusion," in SPE Journal, July 1960, pp. 705–709.

Motier, Robert F.: "Distortion Printing and Vacuum Forming of Thermoplastic Sheet." In SPE Journal, July 1962, pp. 741–745.

Koppers Co.: "Technical Manual Dylite Expandable Polystyrene:Thermoforming Foam Polystyrene Sheet and Polystyrene-Foam Polystyrene Laminates," Bulletin C–9–273, chapter 4c, Apr. 15, 1962, pp. 1–6, 18–22.

PHILIP E. ANDERSON, Primary Examiner

U.S. Cl. X.R.

156—244, 277; 161—160, 413; 264—50, 53, 134, 321